UNITED STATES PATENT OFFICE.

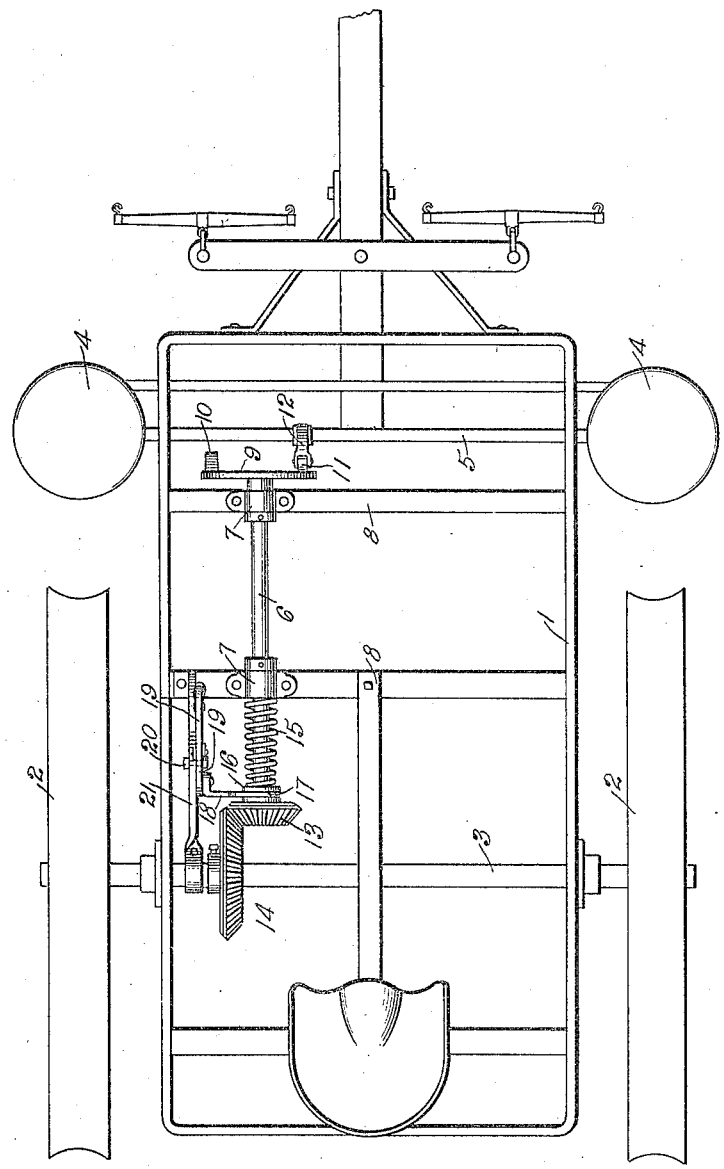

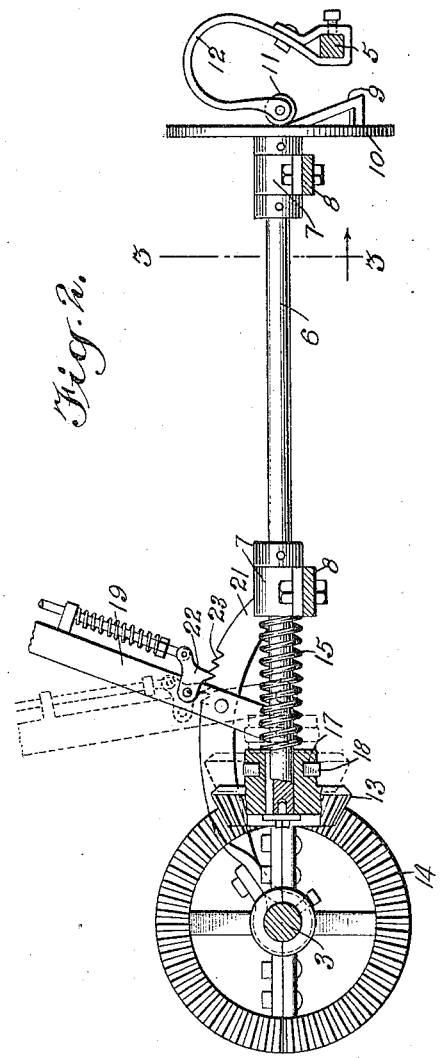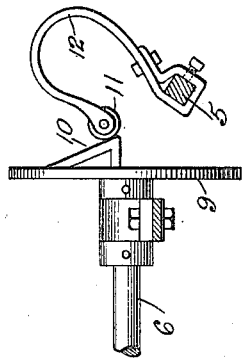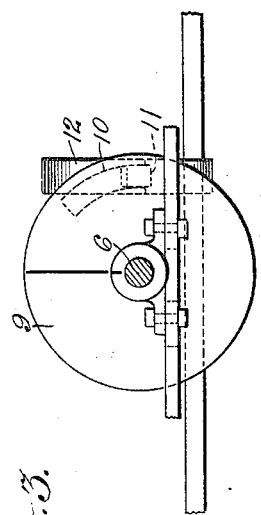

OTTO HENRY KOHLHAAS, OF CALUMET, MICHIGAN.

CHECK-ROW DEVICE FOR CORN-PLANTERS.

1,306,821.

Specification of Letters Patent.   Patented June 17, 1919.

Application filed May 22, 1918.   Serial No. 236,053.

*To all whom it may concern:*

Be it known that I, OTTO H. KOHLHAAS, a citizen of the United States, and a resident of Calumet, in the county of Houghton and State of Michigan, have invented a new and Improved Check-Row Device for Corn-Planters, of which the following is a full, clear, and exact description.

This invention relates to planters and has to deal more particularly with a time and labor saving improvement on a check rower, which eliminates the use of the check wire.

The invention has for its general objects to provide a device which may be in the nature of an attachment for a corn planter already in use, or which may be an essential part of the machine as originally built, for the purpose of automatically dropping seeds the proper distances apart in the rows without the use of check wires, the device comprising a shaft which is adapted to be thrown into and out of gear with the axle of the planter and which carries a cam or equivalent element which imparts a periodic rocking motion to the connecting rod between the hoppers of the planter, so as to cause the hoppers to open and drop the seeds at uniformly distant points as the machine moves forwardly in the rows.

For a more complete understanding of the invention reference is to be had to the following description and claim taken in connection with the accompanying drawings which illustrate one embodiment of the invention and wherein similar characters of reference indicate corresponding parts in all the views.

Figure 1 is a plan view of a planter with the check rower applied thereto;

Fig. 2 is an enlarged vertical section showing the attachment;

Fig. 3 is a sectional view on the line 3—3, Fig. 2; and

Fig. 4 is a detail view showing the action of the cam on the element that operates the dropping means of both hoppers.

In the present instance the invention is shown as an attachment for an ordinary planter, but it is to be understood that the invention can be manufactured with the planter as an essential part thereof.

The planter comprises a frame 1 supported on wheels 2 fixed to a revolving axle 3 suitably mounted on the frame, and in front of the wheels are seed hoppers 4 having the usual dropping mechanisms, the two dropping mechanisms being connected by a rock shaft 5.

The invention comprises suitable means under the control of the operator whereby power is derived from the axle 3 to rock the shaft 5 of the seed dropping mechanisms, so that seeds can be dropped in hills any desired distance apart in rows. In the present instance a longitudinally extending shaft 6 is mounted in bearings 7 in cross bars 8 fastened to the frame of the machine, and on the front of the shaft 6 is a cam wheel 9 having a cam projection 10 so arranged as to engage a roller 11 on an arm 12 fastened to the rock shaft 5, so that with each rotation of the disk or wheel 9 the shaft 5 will be rocked back and forth to cause seeds to be dropped from the hoppers 4. The arm 12 is in the form of a gooseneck and is shown in Figs. 2 and 4, and is rigidly attached to the shaft 5. On the rear end of the shaft 6 is a bevel pinion 13 that meshes with a bevel gear 14 fixed on the axle 3. The pinion 13 is feathered on the shaft 6 and is urged in engagement with the gear 14 by a spring 15 arranged on the rear end of the shaft and interposed between the adjacent bar 8 and the pinion 13. The hub 16 of the pinion has an annular groove 17 into which engages a fork 18 connected with a controlling lever 19, said lever being fulcrumed at 20 on a supporting frame 21 and having a locking device 22 for engaging teeth 23 on the frame 21, whereby the pinion 13 can be held out of engagement with the gear 14 when it is desired to move the planter, without the seed dropping mechanism being actuated.

It will be understood that the machine can be adjusted to drop seeds at any desired interval by simply changing the gear ratio between the axle and the cam shaft, it being merely necessary to substitute the desired pinion and gear for the pinion 13 and gear 14.

From the foregoing description taken in connection with the accompanying drawings, the advantages of the construction and method of operation will be readily understood by those skilled in the art to which the invention appertains, and while I have described the principle of operation, together with the machine which I now consider to be the best embodiment thereof, I desire to have it understood that the machine shown is merely illustrative and that such changes may be made when desired as fall within the scope of the appended claim.

Having thus described my invention, I claim as new and desire to secure by Letters Patent:

In a planter, the combination of a rock shaft for the seed-dropping mechanism, an axle, a gear on the axle, a longitudinal shaft extending between the axle and rock shaft and at right angles to both, a pinion on the intermediate shaft, and meshing with the gear of the axle, a cam wheel on the intermediate shaft and having cam projections on one face, a curved arm on the rock shaft for engagement by the cam projections, means for feathering the pinion on the intermediate shaft, a spring acting on the pinion to hold the same in mesh with the said gear, a lever having a fork engaging the pinion to move it out of engagement with the gear, and means for locking said lever in position.

OTTO HENRY KOHLHAAS.

Copies of this patent may be obtained for five cents each, by addressing the "Commissioner of Patents, Washington, D. C."